United States Patent [19]

Munoz et al.

[11] 4,363,293

[45] Dec. 14, 1982

[54] PISTON FOR A RECIPROCATING PISTON MACHINE, PARTICULARLY AN INTERNAL COMBUSTION ENGINE

[75] Inventors: Bernard Munoz, Puiseux; Eric Tavenne, Paris, both of France

[73] Assignee: Societe d'Etudes de Machines Thermiques S.E.M.T., Saint Denis, France

[21] Appl. No.: 254,381

[22] Filed: Apr. 15, 1981

[30] Foreign Application Priority Data

May 30, 1980 [FR] France ............................ 80 12148

[51] Int. Cl.³ .............................................. F01D 3/10
[52] U.S. Cl. .................................. 123/41.38; 92/186; 123/41.37
[58] Field of Search ............... 123/41.34, 41.35, 41.37, 123/41.38, 41.39; 92/110, 186, 188–190

[56] References Cited

U.S. PATENT DOCUMENTS 3,930,472  1/1976  Athenstaedt ................. 123/41.37 X
4,005,686  2/1977  Wizemann et al. ............. 123/41.38

FOREIGN PATENT DOCUMENTS 1112858  8/1961  Fed. Rep. of Germany .
2533556  1/1977  Fed. Rep. of Germany ... 123/41.35
1484865  6/1967  France .
2246742  5/1975  France .
2396172  1/1979  France .
 776273  6/1957  United Kingdom ............. 123/41.35

Primary Examiner—William A. Cuchlinski, Jr.
Attorney, Agent, or Firm—Kenyon & Kenyon

[57] ABSTRACT

A piston for a reciprocating piston machine, of the type swivelled by means of a piston pin to the associated connecting rod small and consisting of two members constituting the piston head and the piston skirt, assembled together by stud bolts. The central portion of the piston skirt is constituted by a cylindrical hollowed central boss, and the connection of the boss to the peripheral cylindrical surface of the piston skirt is by a peripheral annular crown. Said hollow of the central boss is provided with radial ribs.

10 Claims, 4 Drawing Figures

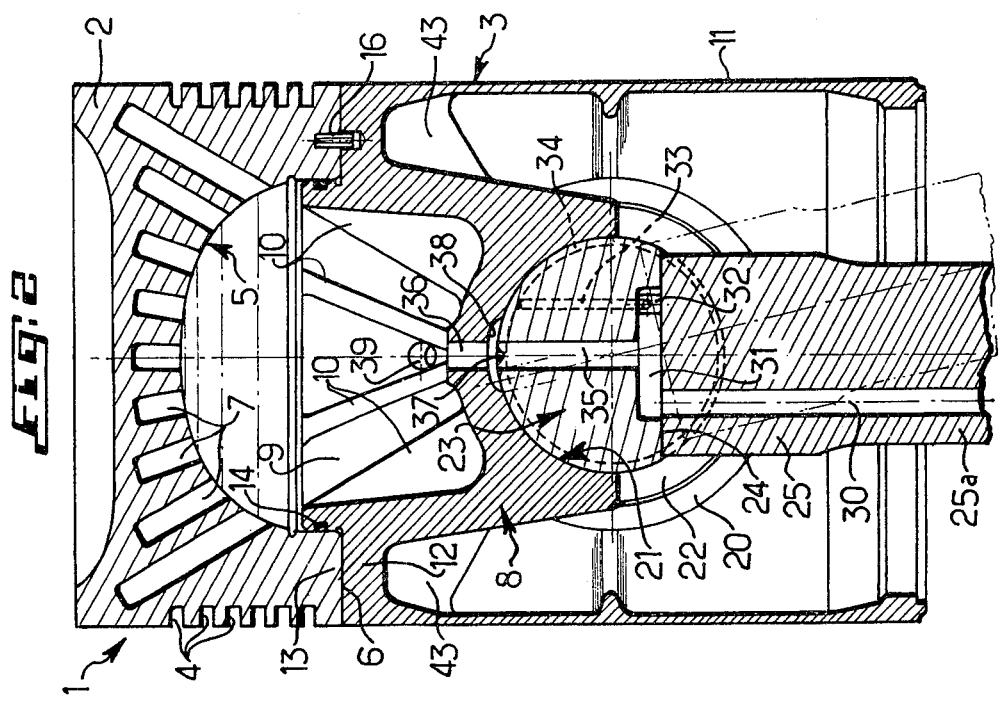
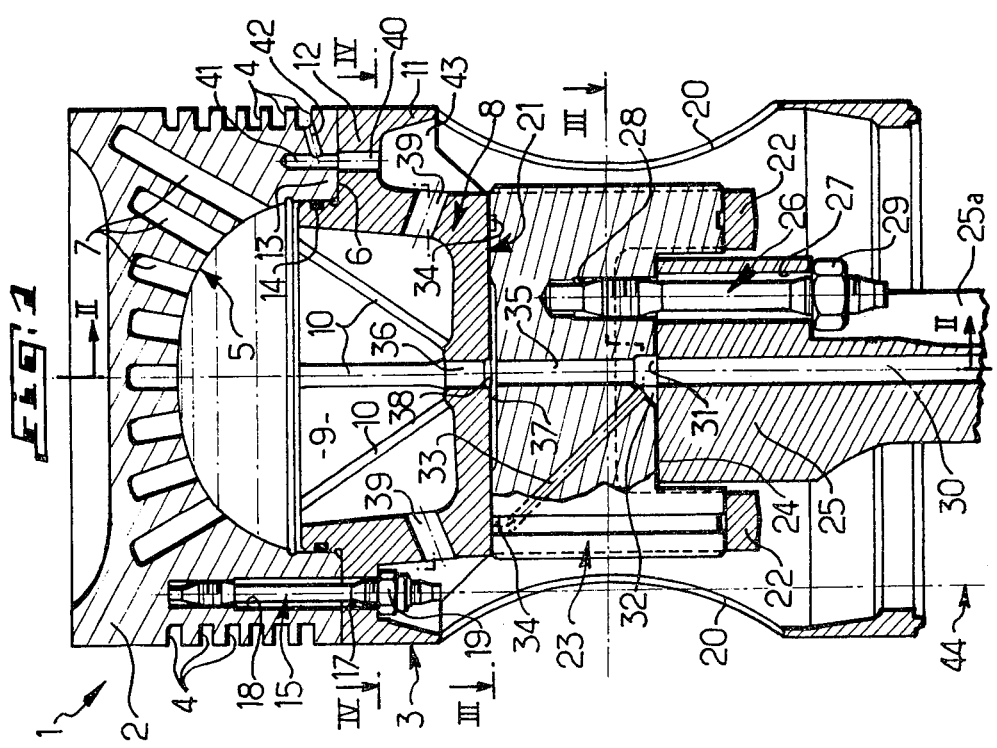

PISTON FOR A RECIPROCATING PISTON MACHINE, PARTICULARLY AN INTERNAL COMBUSTION ENGINE

The present invention relates generally to a piston for a reciprocating piston machine, particularly an internal combustion engine such as a Diesel engine, and has more particularly for a subject matter a piston of the type swivelled by means of a piston pin to the small end of a connecting rod.

In most of the known pistons, the piston pin is rotatably mounted in a connecting rod small end bushing and in two spaced bearings connected with the piston and located on either side, respectively, of the associated connecting rod small end.

Under such conditions, the efforts of the piston are applied to the piston pin only locally by being concentrated in the region of the bearings, thus subjecting the piston pin mainly to shearing stresses. Such stresses impose a limitation on the maximum combustion pressure.

According to another piston type known particularly from French Pat. No. 2 246 742, the piston pin takes its bearing over its whole length in a substantially semi-circular transverse cradle forming an integral part of the piston skirt and terminating at each end with an annular bearing completely surrounding the corresponding end of the piston pin and having no bushing. The connecting rod small end is not provided with a bearing and therefore with a bushing for the pin, but is in the form of a block directly fastened to the piston pin by means of stud bolts designed so as to provide some longitudinal resilient deformability. Such a mounting of the piston pin allows the aforementioned drawbacks to be eliminated.

As a rule, in the known single-piece or two-piece pistons, the necessary presence, especially in the large size engines mainly of the Diesel type, of cavities for cooling fluid flow in the piston head requires a relatively fine structure with relatively thin cavity partitions or walls for a better removal of heat. In the case of a piston consisting of two parts constituting respectively the piston head and the piston skirt, the piston head and skirt assembly must be designed according to the various thermal and mechanical stresses to which the piston is subjected.

In the two-member piston described in the aforementioned patent, the piston head is provided in its end surface adjacent to the piston skirt, with a central hollow constituting a main cooling chamber and an annular hollow constituting a secondary cooling chamber provided in proximity to the periphery of the piston head end surface. The annular end surface of the piston head defined between the central hollow and the annular hollow constitutes the contact surface between the piston head and the piston skirt. The piston skirt end surface adjacent to the piston head also possesses a central hollow and an annular hollow which communicate with the central hollow and the annular hollow, respectively, of the piston head. The assembling of the piston head and skirt is effected by means of stud bolts extending through the piston head and skirt joint plane.

It should be noted that this assembling is effected in a region relatively remote from the periphery of the piston head and skirt. This results in a poor distribution of the efforts between the piston head and the piston skirt, especially at the periphery, i.e., in the region of the piston rings.

The invention has for a subject matter a piston of the type described in the aforementioned French patent, but which provides:

a different structure, particularly at the joint plane between the piston head and the piston skirt to ensure a better distribution of the efforts and obtain increased stiffness and a less uncertain behaviour;

a better accessibility to the piston head and skirt assembling stud bolts; and a better cooling system, especially in the region of the piston head.

To this end, the invention provides a piston for a reciprocating piston machine, particularly an internal combustion engine, of the type swivelled by means of a piston pin to an associated connecting rod small end and consisting of two members forming respectively the piston head and the piston skirt assembled together for example by means of stud bolts, the piston head being provided in its end surface adjacent to the piston skirt with a central hollow constituting a portion of a cooling chamber, the other portion of the said chamber being constituted by a central hollow provided in the adjacent end surface of the central portion of the piston skirt; and comprising a cooling and lubricating system, characterized in that the said central portion of the piston skirt is constituted by a substantially cylindrical hollowed boss, and in that the connection of the said boss to the cylindrical peripheral surface of the said piston skirt is by means of a peripheral annular crown with a flat upper surface perpendicular to the piston axis and delimited inwardly by a shoulder centered with or without fluid-tightness and with or without a clearance in the hollow of the piston head, the upper surface of the said crown constituting the joint surface between the piston skirt and the piston head, and upon which bears the peripheral annular flat surface of the piston head defined around the said hollow of the piston head, the said substantially cylindrical hollow of the central boss being provided with radial ribs for better distributing the efforts transmitted by the piston head.

According to another characterizing feature of the invention, the hollow provided in the piston head is substantially in the form of a dome, for example of a basket handle, this bearing configuration allowing the piston head to behave itself as a self-supporting vault whose strength is all the better as the load is greater.

According to another characterizing feature of the invention, at least two openings are provided in the cylindrical peripheral surface of the piston skirt for direct access to the piston head and skirt assembling stud bolts, each stud bolt extending throughout an associated orifice machined in the peripheral annular crown of the central boss of the piston skirt and pentrating into an at least partially tapped blind orifice machined in the piston head.

In a manner known per se, the piston pin is provided in its medial portion with a hollow in which is engaged the associated free end of the connecting rod directly fastened to the piston pin by means of a stud bolt providing some longitudinal resilient deformability. Moreover, the piston pin is mounted in a hollow in the form of a semi-circular cradle provided in the piston skirt central boss end surface opposite to the piston head, and terminating at each end with an annular bearing directly supporting the associated end of the piston pin.

In accordance with another characterizing feature of the piston according to the invention, the lubricating and cooling system comprises a slot machined in the aforesaid hollow of the piston pin, extending in a plane perpendicular to the piston pin and symmetrical with respect to the transverse plane mid-perpendicular to the piston pin, and the top of which is provided with two widened portions, each having a substantially isosceles trapezoidal shape in the longitudinal vertical medial plane of the piston pin, the said slot communicating with the end of a cooling and lubricating fluid flow passage, extending in the associated connecting rod body and opening at the end surface of the connecting rod small end.

According to another characterizing feature of the invention, two oblique lubrication passages are machined in the piston pin and open, at one end, in the two oblique flat faces, respectively, of the said widened portions of the slot, whereas the other two ends of the two oblique passages open into two circular slots, respectively, provided in the two ends, respectively, of the piston pin in the region of the annular bearings supporting the piston pin ends.

The slot machine in the piston pin also communicates with the cooling chamber and, according to another characterizing feature of the invention, in order to increase the cooling, the hollow machined in the piston head and constituting a portion of the cooling chamber advantageously comprises a plurality of blind holes allowing the cooling liquid to reach the hottest points of the piston head without weakening the mechanical resistance of the said head.

The presence of the slot machined in the piston pin offers an important advantage, especially in case the connecting rod body has an I-beam cross section and the cooling and lubricating liquid feed passage is located in a flange of the I-beam section and is therefore shifted with respect to the longitudinal axis of the connecting rod. Indeed, such a slot ensures a symmetrical mounting of the piston pin.

Other advantages, characterizing features and details of the invention will appear more clearly from the following explanatory description made with reference to the appended drawings given solely by way of example and wherein:

FIG. 1 is a longitudinal sectional view of the piston according to the invention;

FIG. 2 is a sectional view upon II—II of FIG. 1;

Figure 3:
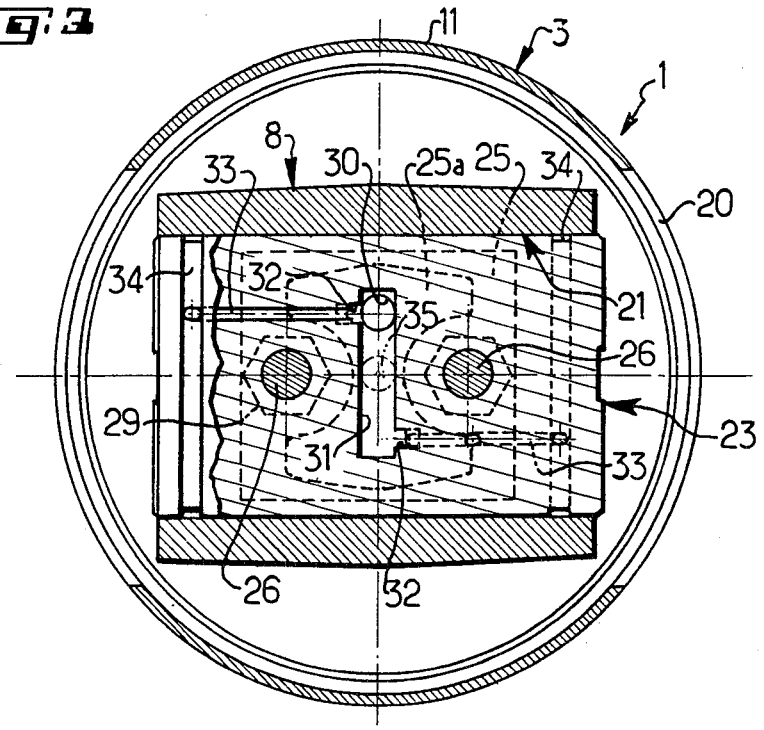
FIG. 3 is an enlarged sectional view upon III—III of FIG. 1.

The piston 1 according to the invention illustrated in the various Figures, particularly in FIGS. 1 and 2, is made up of two members constituting the piston head 2 and the piston skirt 3, respectively. The piston head 2 and the piston skirt 3 are cylindrical in shape and mounted co-axially in prolongation of one another.

Several spaced grooves 4 parallel to one another are provided in the cylindrical peripheral surface of the piston head 2. In each groove 4 is mounted a piston ring (not shown). All the piston rings are therefore supported by the piston head 2.

The end surface or terminal end of the piston head 2, facing the piston skirt 3, possesses a central hollow 5 constituting the first portion of a main inner cooling chamber of the piston. This central hollow 5 displays several characteristics:

it is advantageously in the shape of a dome for example of a basket handle, which bearing configuration allows the piston head 2 to behave as a self-supporting vault whose strength is all the better as the load is greater;

it defines, in the region of the end surface of the piston head 2 adjacent to the piston skirt 3, a flat annular peripheral surface 6 perpendicular to the piston axis and constituting a connecting or contact surface for assembling the piston head 2 with the piston skirt 3; and it is extended within the piston head 2 by several flat-or spherical-bottomed blind holes 7 so as to increase the volume of the main cooling chamber of the piston, but above all to reach the hottest points of the piston head 2 without reducing the strength of the piston head.

The piston skirt 3 possesses a hollowed central boss 8. More specifically, boss 8 has a central hollow 9 in its end surface opposite the piston head 2. The hollow 9, substantially cylindrical in shape, has several characteristics:

it constitutes the second portion of the main cooling chamber of the piston, and it contains several radial ribs or webs 10 allowing the efforts transmitted by the piston head to be better distributed.

The central boss 8 is connected to the outer peripheral cylindrical casing 11 of the piston skirt 3 by a peripheral annular flat crown 12 perpendicular to the piston axis. The upper end surface of the crown 12 opposite the piston head 2 constitutes the connecting or contact surface upon which the peripheral annular surface of the piston head 2 bears. The crown 12, at its upper end adjacent to the piston head 2, is delimited internally by a shoulder 13 centered, with or without a clearance, in the hollow 5 of the piston head 2, with or without an annular gasket 14.

The assembling of the piston head 2 and the piston skirt 3 is by means of several stud bolts 15, each extending through the joint plane defined by the mutually opposite peripheral annular end surfaces of the piston head 2 and the crown 12 of the piston skirt 3. The positioning of the piston head 2 on the piston skirt 3 is by means of a guiding pin 16 (FIG. 2).

Each stud bolt 15 extends through an associated orifice 17 machined in the annular crown 12 of the piston skirt 3 and penetrates into an at least partially tapped orifice 18 machined in the piston head 2 opposite the orifice 17. Each stud bolt 15 is locked by a nut 19 screwed onto the free end of the stud bolt 15 extending beyond the end surface of the crown 12 opposite to the piston head 2. To this end, the outer peripheral casing 11 of the piston skirt 3 is advantageously provided with at least two, for example diametrically opposite, orifices 20 directly allowing the mounting and removal of the stud bolts 15. Direct access to the stud bolts may also be gained from the outside through the skirt 3 as indicated at 14 in FIG. 1 and independently of the orifices 20 without any previous disassembling.

The end surface, opposite to the piston head 2, of the central boss 8 of the piston skirt 3 is provided with a recess 21 for example in the shape of a substantially semi-circular cradle and ending on each side with an annular bearing 22.

The piston pin 23 extending perpendicularly to the axis of the piston 1 is mounted directly in the cradle 21 and supported directly at each end by the associated bearing 22 of the cradle 21. The piston pin 23 is engaged into the cradle 21 through one of the orifices 20 of the piston skirt 3.

The piston pin 23 is provided in its medial portion with a hollow 24 into which is engaged the free small end 25 of the associated connecting rod fastened directly to the piston pin 23 by at least one stud bolt 26 possessing some resilient longitudinal deformability.

In the form of embodiment illustrated (FIGS. 1 and 3) the connecting rod small end 25 is in the form of a flat parallelepipedic block, whereas the connecting rod body 25a has an I-beam cross section allowing each assembling stud bolt 26 to be easily mounted between the connecting rod small end 25 and the piston pin 23. More precisely, each stud bolt 26 extends through an orifice 27 provided in the connecting rod small end 25 and then a partially tapped blind bore 28 machined in the piston pin 23 and opens opposite the orifice 27. A nut 29 locks the stud bolt 26.

The piston 1 according to the invention comprises a lubricating and cooling system supplied from a passage 30 machined in the connecting rod body and opening at the end surface of the connecting rod small end 25. In the example illustrated (FIGS. 2 and 3), the passage 30 is shifted with respect to the connecting rod axis and extends through the connecting rod body 25a in the region of a flange of the I-beam cross section of the connecting rod body 25a, i.e. in a portion of increased material in order not to limit the strength of the connecting rod.

The passage 30 opens at the end surface of the connecting rod small end 25 into a cavity in the form of a slot 31 (FIGS. 2, 3) machined in the hollow 24 of the piston pin 23. This slot has a substantially rectangular cross section and extends in a plane perpendicular to the piston pin 23. At the top of the slot 31 (FIGS. 1 and 3), substantially towards both ends of the slot are provided two widened portions 32 having a substantially isosceles trapezoidal shape in the longitudinal vertical medial plane of the piston pin 23. The oblique flat faces of the widened portions 32 (FIG. 3) allow the direct drilling of two symmetrical oblique lubricating passages 33, respectively, each opening into a circular slot 34 of the end of the piston pin 25 in the region of the corresponding annular bearing 22.

The slot 31 communicates with the cooling chamber (5, 9) of the piston 1 through two passages 35, 36. The passage 35 (FIG. 1) extends through the piston pin 23 and opens into a groove 37 parallel with the piston pin 23 or in helix arrangement and intended to ensure the lubrication of the bearing interface between the piston pin 23 and the cradle 21 in the region located between the two end bearings 22 of the cradle 21. The passage 36 extends through the central boss 8 of the piston skirt 3 and opens, on the side of the piston pin 23, into an arcuate slot 38 machined in the inner wall of the cradle 21 of the piston skirt 3. The arcuate slot 38 is such that during the displacements of the piston resulting in a swivelling of the connecting rod small end, the passage 35 always communicates with the slot 38 so as to ensure a permanent feeding of the cooling chamber (5, 9).

The cooling chamber (5, 9) communicates with the outside space through at least one lateral orifice 39 machined in the central boss 8 of the piston skirt 3. Each orifice 39 opens into a space defined between the central boss 8 and the peripheral outer casing 11 of the piston skirt 3.

Referring again to FIG. 1, the peripheral crown 12 of the central boss 8 of the piston skirt 3 is provided with at least one orifice 40 which opens into a blind orifice 41 machined in the piston head 2. Into the blind bore 41 opens the end of a passage 42 the other end of which communicates with the groove 4 in which is mounted the piston scraper ring. This arrangement allows the lubricating liquid, such as oil, in excess in the region of that ring to be removed.

Figure 4:
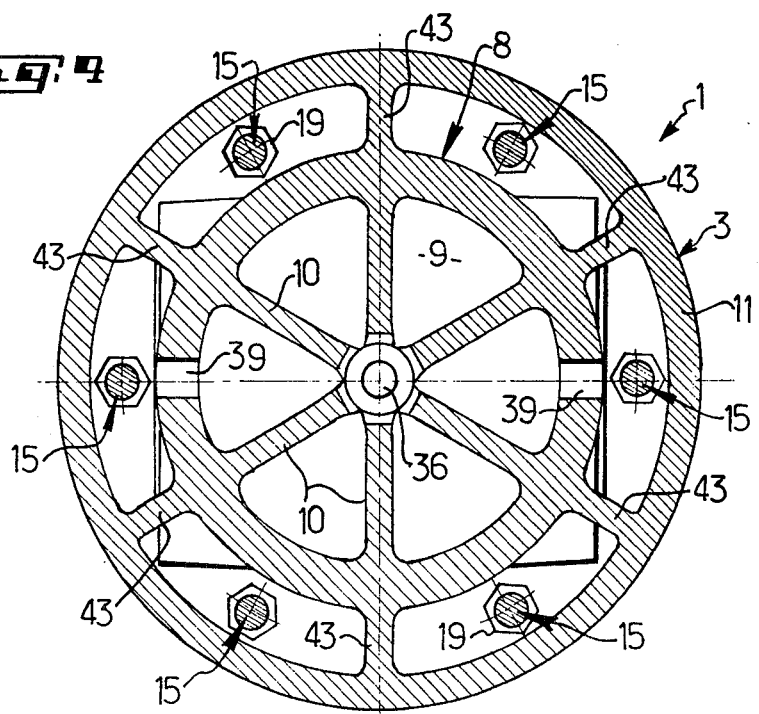
FIG. 4 is an enlarged sectional view upon IV—IV of FIG. 1.

It should also be noted that to further increase the stiffness of the piston, particularly in the region of the outer peripheral casing 11 of the piston skirt 3, there are provided stiffening ribs 43 extending between the outer peripheral surface of the central boss 8 and the outer peripheral casing 11 of the piston skirt 3 (FIGS. 1 and 4). Such ribs also allow a better transmission of the efforts of the crown 12 towards the piston pin 23.

Such a piston has very good strength, particularly in the assembling region of the piston head 2 with the piston skirt 3, although the joint interface is relatively reduced.

The presence of the slot 31 in the piston pin 23 allows a symmetrical arrangement of the piston pin 23 in its cradle 21 due to the fact that the lubricating and cooling fluid feed passage is shifted with respect to the connecting rod axis.

The piston according to the invention may have a piston head 2 of steel and a piston skirt 3 of cast iron. The piston skirt 3 is preferably constituted in at least one piece to facilitate its manufacture.

The operation of a piston according to the invention is quite conventional and does not need a more detailed description. It is to be noted, however, that, in particular during the combustion period, the piston pin 23 is in contact with the upper wall of the cradle 21, so that the pressure forces are uniformly distributed all along the pin. During the upward motion of the piston 1, the piston pin 23 bears against the lower portion of the annular bearings 22, which means that the reaction is local, but this is not harmful since the inertial forces acting at that moment are approximately 10 times smaller than the combustion pressure forces. The studbolts 26 assembling the connecting rod small end 25 to the piston pin 23 advantageously possess longitudinal resilient deformability, i.e. tractional elongation under the action of the inertial forces, especially when the upwardly moving piston is pulling on the crank and connecting rod system.

Thus, a piston according to the invention is provided with a piston head and a piston skirt which, once assembled together, ensure a more uniform transmission of the efforts to the piston pin. Moreover, by eliminating the risk of gapping between the piston head and the piston skirt towards the outer periphery of their contact surface, a better behaviour of the piston ring system is obtained.

Lastly, it is important to note that the access to the stud bolts assembling the piston head to the piston skirt may be had directly from the outside through the skirt and along the axes of the stud bolts. The bolts are therefore accessible without disassembling the piston and connecting rod assembly.

Of course the invention is by no means limited to the forms of embodiment described and illustrated, which have been given by way of example only. In particular, it comprises all means constituting technical equivalents to the means described as well as their combinations should the latter be carried out according to its gist and used within the scope of the following claims.

What is claimed is:

1. A piston for a reciprocating piston machine, said piston being swivelled by means of a piston pin to an associated connecting rod small end and including a piston head and a piston skirt assembled together by stud bolts, the piston head comprising on its end surface adjacent to the piston skirt a central hollow forming a portion of a cooling chamber, the other portion of said chamber being formed by a central hollow provided in the adjacent end surface of the central portion of the piston skirt, said chamber comprising part of a cooling and lubricating system wherein said central portion of the piston skirt is constituted by a substantially cylindrical hollowed central boss provided with radial ribs to better distribute the force transmitted by the piston head, the connection of said central boss to the peripheral cylindrical surface of said piston skirt is by means of a peripheral annular crown with a flat upper surface perpendicular to the axis of the piston and delimited inwardly by a shoulder which is centered in the piston head hollow, the upper surface of said crown constituting the joint surface between the piston skirt and the piston head, and upon which bears the peripheral annular flat surface of the piston head delimited around said piston head hollow, each of said assembling stud bolts extending throughout an associated orifice machined in the annular crown of said central boss of the piston skirt and engaged into a tapped blind orifice machined in the piston head, said assembling stud bolts being accessible directly from the outside through the piston skirt and in the axial direction of said stud bolts.

2. A piston according to claim 1, wherein said hollow provided in the piston head is substantially in the shape of a dome, such a configuration allowing the piston head to behave as a self supporting vault.

3. A piston according to claim 1 wherein at least two openings are provided in the peripheral cylindrical surface of the piston skirt for mounting the piston pin and allowing direct access to said piston head and skirt assembling stud bolts.

4. A piston according to claim 3 characterized in that it comprises stiffening ribs provided between the outer peripheral surface of the aforesaid central boss of the piston skirt and the outer peripheral casing of the piston skirt.

5. A piston according to claim 4, characterized in that the aforesaid outer peripheral casing of the piston skirt is provided with at least two, for example diametrically opposite, orifices allowing, on the one hand, the mounting and removal of the aforesaid piston head and skirt assembling stud bolts and, on the other hand, the mounting of the piston pin in the aforesaid piston skirt cradle.

6. A piston according to claim 3, wherein the piston pin is provided in its medial portion with a hollow in which is engaged the associated connecting rod small end directly fastened to the piston pin by at least one stud bolt possessing some longitudinal resilient deformability, the piston pin being mounted in a semi-circular cradle-shaped recess provided in the end surface, opposite to the piston head, of the aforesaid central boss of the piston skirt and ending on each side with an annular bearing directly supporting the associated end of the piston pin, characterized in that the aforesaid lubricating and cooling system comprises a slot machined in the said piston pin hollow, extending in a plane perpendicular to the piston pin and symmetrically with respect to the transverse plane mid-perpendicular to the piston pin, and the top of which has two widened portions, each having a substantially isosceles trapezoidal shape in the longitudinal vertical medial plane of the piston pin, the said slot communicating with the end of a cooling and lubricating fluid feed passage extending in the associated connecting rod body and opening at the end surface of the connecting rod small end.

7. A piston according to claim 6, characterized in that the aforesaid lubricating system comprises two oblique passages machined in the aforesaid piston pin and opening at one end, into the two oblique flat faces, respectively, of the widened portions of the said slot, whereas the other two ends of the said oblique passages open into two circular slots, respectively, provided in the two ends, respectively, of the piston pin in the region of the aforesaid annular bearings supporting the ends of the piston pin.

8. A piston according to claim 7, characterized in that the aforesaid slot machined in the recess of the piston pin communicates with the aforesaid cooling chamber through two passages machined in the piston pin and the aforesaid boss of the piston skirt, respectively, the passage extending through the piston pin opening into a groove parallel to the piston pin and extending over a portion of a generatrix of the said pin, whereas the said passage extending through the central boss of the piston skirt opens, on the piston pin side, into an arcuate slot machined in the inner wall of the aforesaid cradle of the piston skirt so as to ensure the continuous feeding of the cooling chamber during the displacement of the piston.

9. A piston according to claim 8, characterized in that it comprises stiffening ribs provided between the outer peripheral surface of the aforesaid central boss of the piston skirt and the outer peripheral casing of the piston skirt.

10. A piston according to claim 9, characterized in that the aforesaid outer peripheral casing of the piston skirt is provided with at least two, for example diametrically opposite, orifices allowing, on the one hand, the mounting and removal of the aforesaid piston head and skirt assembling stud bolts and, on the other hand, the mounting of the piston pin in the aforesaid piston skirt cradle.

* * * * *